United States Patent [19]

Kraft

[11] Patent Number: 4,983,997

[45] Date of Patent: Jan. 8, 1991

[54] MICROPHOTOGRAPHIC APPARATUS WITH AUTOMATIC FILM FORMAT REFLECTION

[75] Inventor: Winfried Kraft, Asslar-Werdorf, Fed. Rep. of Germany

[73] Assignee: Wild Leitz GmbH, Wetzlar, Fed. Rep. of Germany

[21] Appl. No.: 407,944

[22] Filed: Sep. 15, 1989

[30] Foreign Application Priority Data

Sep. 16, 1988 [DE] Fed. Rep. of Germany ....... 8811737

[51] Int. Cl.⁵ ............................................. G03B 17/48
[52] U.S. Cl. ...................................... 354/79; 354/159
[58] Field of Search ................................. 354/79, 159

[56] References Cited

U.S. PATENT DOCUMENTS 3,633,482  1/1972  Tsuda ............................... 354/79 X

*Primary Examiner*—Brian W. Brown
*Attorney, Agent, or Firm*—Foley & Lardner, Schwartz, Jeffery, Schwaab, Mack, Blumenthal & Evans

[57] ABSTRACT

The invention relates to a microphotographic apparatus which superimposes one set of film format markings on an image recorded by a film type held by a camera attachment. Specifically, the apparatus has two opaque carriers with multiple sets of transparent markings. These carriers can be moved relative to one another such that only one set of markings on the first carrier is aligned with a corresponding set of markings on the second carrier and therefore, when light is projected through the carriers only one set of markings is superimposed on the recorded image.

15 Claims, 3 Drawing Sheets

MICROPHOTOGRAPHIC APPARATUS WITH AUTOMATIC FILM FORMAT REFLECTION

BACKGROUND OF THE INVENTION

The invention relates to a microphotographic apparatus having an exchangeable camera attachment, a photo ray path and a reflecting ray path and fixed opaque carriers with transparent film format markings.

Apparatuses of this type are known from DE-OS No. 3,506,492 and DE-OS No. 3,627,354. Both specifications describe a microscope which has a photographic apparatus and an additional ray path, in which, in addition to a light-measuring or color-temperature-measuring apparatus, a carrier with corresponding film format markings is arranged. Such a carrier is illuminated by a light source provided in the additional ray path. The image of the carrier is reflected via a lens system and a beam splitter into the photo ray path and reproduced in an intermediate image plane of the eyepiece, so that the user can see both the focussed object and the area to be photographed in the eyepiece.

An apparatus of this type has proved successful in practice and allows a wide variety of camera or film formats to be connected. The carrier can in this case be equipped with numerous film format markings which are all reproduced in the intermediate image plane of the eyepiece and thus are superimposed on the visible object field. In some cases this can lead to difficulty associating the respective markings with the film being used at the time. Furthermore, a large disadvantage of these systems is that important details are often masked by the large number of markings which are superimposed on the object.

SUMMARY OF THE INVENTION

It is therefore an object of the present invention to avoid the disadvantages of the known prior art and to specify an apparatus which restricts the number of film format markings visible in the eyepiece to those that are necessary, while ensuring a clear association between the reflected film format marking and the camera attachment which has been respectively adapted, without any additional operating moves being needed.

Another object of the invention is to provide a system for superimposing film format markings on an image, which can be attached to an existing microscope system.

Still another object of the invention is to provide a microphotographic apparatus which can adapt to many camera attachments containing different film types.

In accomplishing the foregoing objects, there has been provided according to the invention a microphotographic apparatus, comprising:
a. a light source;
b. a first carrier positioned along the path of light from said light source which has multiple sets of markings on it;
c. a second carrier positioned along the path of light from said light source which has multiple sets of markings on it;
d. at least one camera attachment which holds at least one film format;
e. a control apparatus coupled to said first carrier and coupled to said camera attachment, wherein said control apparatus moves said first carrier in response to the film format present in the camera attachment.

Further objects, features and advantages of the present invention will become apparent from the detailed description of preferred embodiments that follows, when considered together with the attached figures of drawings.

DETAILED DESCRIPTION OF PREFERRED EMBODIMENTS

Figure 1:
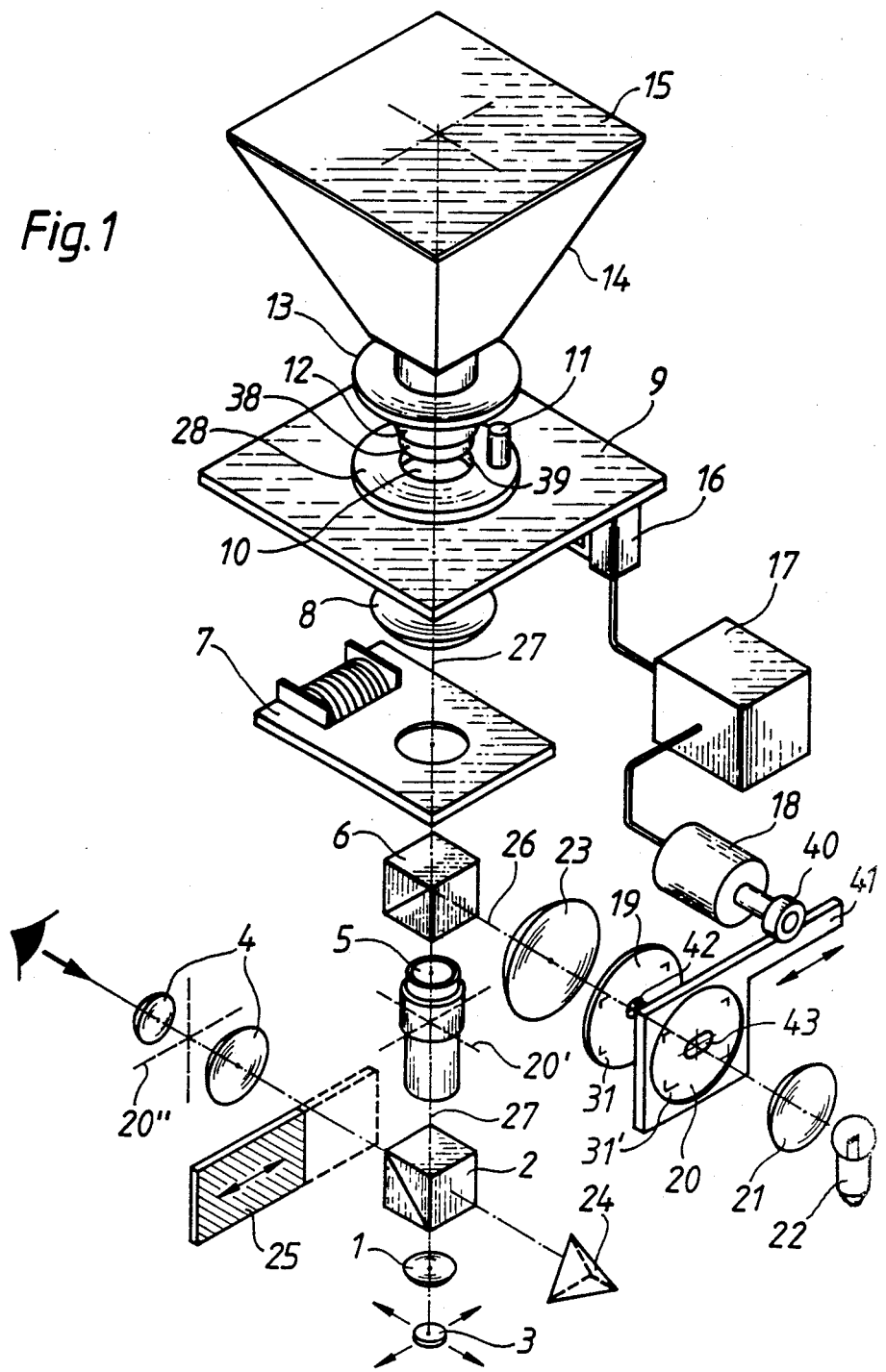
FIG. 1 is an exploded perspective view of a microphotographic apparatus with a reflecting ray path.

FIG. 1 shows the photo ray path 27 of a microscope with the elements arranged therein. Starting from an object 3 this ray path 27 passes through a microscope objective 1 and a tubular beam splitter 2. The tubular beam splitter 2 directs a part of the light coming from the object 3 into the eyepiece, which is represented here diagrammatically by a group of lenses 4, and directs a part of the light into photographic eyepiece 5. Between the group of lenses 4 and the tubular beam splitter 2 is a displaceable dark-ground stop 25. A triple reflector 24 is arranged on this object axis on the other side of the tubular beam splitter 2. As already noted, part of the light incident on tubular beam splitter 2 passes through eyepiece 5.

Further along the ray path 27, past the photographic eyepiece 5, is an additional beam splitter 6, a camera shutter device 7 and an imaging lens 8. In a part of the camera casing 9, which is the only part of the camera casing 9 shown in the figures, is an aperture 10 with a connection surface 28 for connection of an exchangeable camera attachment 14. The camera attachment 14 has a connection piece 12 adapted to the aperture 10 and a control ring 13. The position of the control ring 13 on the connection piece 12 identifies the particular film format being used. The connection piece 12 has a threading 38, which corresponds to threading 39 on the associated connection surface 28, for fastening of the camera attachment 14 to the camera casing 9. The camera attachment 14 contains a film plane 15 in its interior. In order to provide a clear illustration of the invention, further details of the camera attachment 14 are not shown.

An axially displaceable pin 11, which is connected to a sliding potentiometer 16, is also arranged on the connection surface 28. A control apparatus 17 is electrically connected to the sliding potentiometer 16 and also connected to an electromotor 18 via an electrical line. The electromotor 18 is connected via mechanical adjusting elements, for example a toothed wheel 40 and a toothed rack 41, to a locating mark carrier 20. The position of a locating mark carrier 20 is horizontally moveable (cf. twin-headed arrow) in the reflecting ray path 26. Along the reflecting ray path, arranged in sequence starting from a light source 22, is a collector lens 21, the locating mark carrier 20, a fixed additional locating mark carrier 19 and an imaging lens 23.

Figure 2:
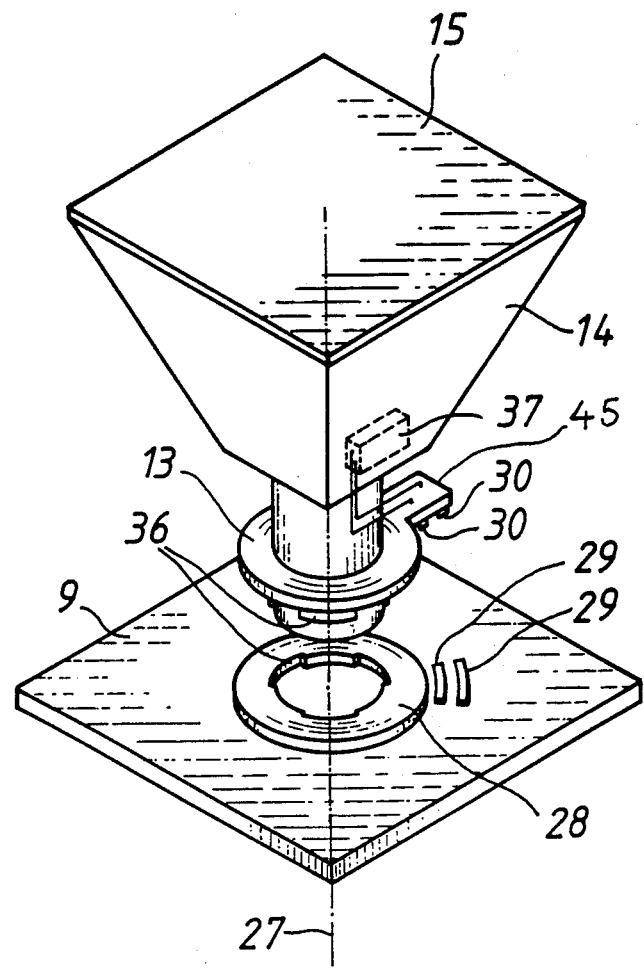
FIG. 2 is a perspective view of an exemplary embodiment of the camera attachment with electrical contacts.

FIG. 2 shows a segment from FIG. 1 along the photo ray path 27, starting with connection surface 28, and illustrates a variation of the method for coupling the camera attachment 14 to the camera casing 9 as well as a variation for transmission of the electrical signals identifying the film format. In these embodiments of the invention, the connection surface 28 of the camera casing 9 has a connection bayonet 36, as well as electrical contact paths 29, which are connected to the control apparatus 17 shown in FIG. 1. On the camera attachment 14, for example on an arm 45 provided on the control ring 13, contact pins 30 are arranged as counterparts to the electrical contact paths 29. These contact pins 30 are electrically connected to a circuit 37. In FIG. 2, circuit 37 is positioned in the camera attachment 14 and generates the electrical signals for identification of the film format.

Figure 3:
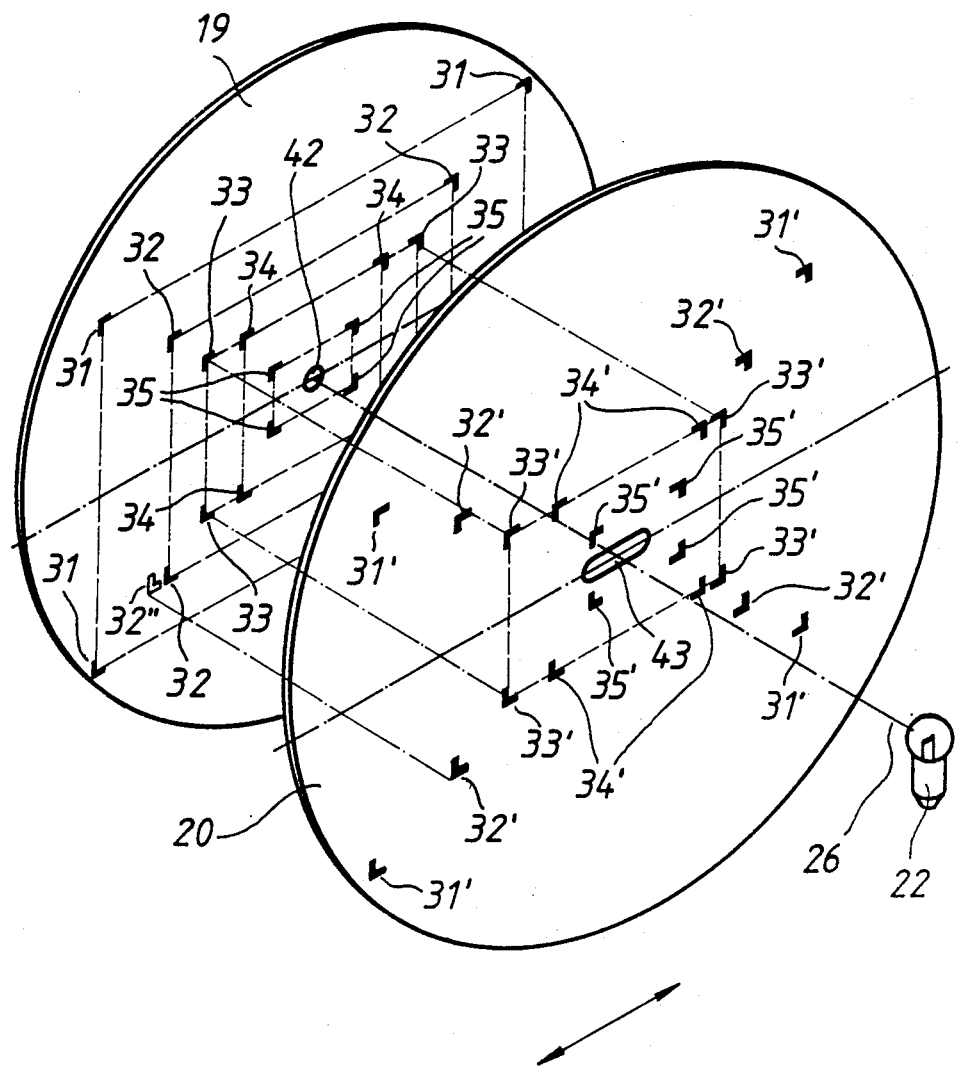
FIG. 3 is a detailed perspective view of the carriers arranged in sequence with the various film format markings.

FIG. 3 shows the two opaque locating mark carriers 19 and 20 arranged in sequence along the reflecting ray path 26. In the illustrated case, the carrier 19 is fixed and has various transparent film format markings 31, 32, 33, 34, 35. In the center of the carrier 19 is a transparent cross-hair 42 for the purpose of judging the focal plane setting of the microscope.

The carrier 20, which is designed to be transversely placeable (cf. twin-headed arrow) by operation of the electromotor 18 in the reflecting ray path 26, similarly has transparent markings 31', 32', 33', 34' and 35'. The size of these markings are made to correspond to the format markings of the carrier 19.

The markings 31'-35' are offset with respect to each other according to the individual displacement paths of the locating mark carrier 20. In the center of the carrier 20 is a transparent oval surface 43 whose size is adapted to the complete displacement path of the carrier 20, so that, irrespective of the individual adjusted film formats, the cross-hair 42 is imaged in the intermediate image planes 20' and 20" in the eyepiece 4.

In the basic position, the carriers 19 and 20 are displaced with respect to each other in such a way that no light from the light source 22 passes via the beam splitter 6 into the photo ray path 27. It is only when a camera attachment 14 is placed in the connection surface 28 that the pin 11 is pressed in via the control ring 13 and the sliding potentiometer 16 is moved. As a result of the changed current/voltage ratio a corresponding signal in the control apparatus 17 is triggered and current is applied to the electromotor 18. The electromotor 18 is suitably designed as a stepped motor and moves the carrier 20, which is coupled to it, in the reflecting ray path 26 in accordance with the signal from the control apparatus 17. One of the transparent markings 31'-35' of the carrier 20 is superimposed on one of the film format markings 31-35 of the carrier 19, so that only one single brilliant frame is formed corresponding to the film format of the camera attachment 14. All other transparent markings of the carrier 20 are imaged on the opaque part of the carrier 19 (cf. in FIG. 3 the marking 32' at the bottom left and its image 32" on the carrier 19). An initial intermediate image 20' of the carriers 19 and 20 or of the brilliant frame is produced in the photo ray path 27 image plane 20' via the lens 23 and the beam splitter 6. By means of the photographic eyepiece 5 this image is imaged, via the tubular beam splitter 2 and the triple reflector 24, into the intermediate image plane 20" in the eyepiece 4.

In this plane 20", the image of the locating mark carriers 19 and 20 is superimposed on the image of the object 3, which is also imaged in the intermediate image plane 20" via the microscope objective 1 and the tubular beam splitter 2.

Before exposure of the photo material located in the film plane 15 it is expedient to insert the dark-ground stop 25 and switch off the light source 22. This prevents any impairment of the object contrast by extraneous light which may be present.

When the camera attachment is removed or changed, the pin 11, which is under spring pressure, returns to its original staring position and a corresponding signal is triggered in the control apparatus 17 via the sliding potentiometer 16. As a result of the signal from the control apparatus 17, the electromotor 18 drives the locating mark carrier 20 back into its original starting position and the reflecting ray path 26 is switched to "dark".

One outstanding feature of the electrically/electromechanically operating embodiments described above is that the space requirement is extremely low, although relatively long distances between the camera attachment 14 and the carriers 19 and 20 can be bridged by electrical lines. Yet another method for coupling the carriers 19 and 20 to the camera attachment 14 is to use a lever mechanism in place of the electrically operating adjustment means. Such a lever mechanism then provides, for example, the connection between the pin 11 and the locating mark carrier 20.

In the aforementioned system each camera attachment, corresponding to a particular film type has a control ring 13, attached to the connection piece 12, whose position identifies the particular film format. However, in another embodiment of the invention the camera attachment would be able to hold different film types and the control ring 13 could be moved into a different fixed position corresponding to each film type which the camera attachment 14 could hold.

The locating mark carrier 20 in the reflecting ray path 26, which is shown here, is displaced by equal amounts as it moves from one film format position to another. Such amounts can, however, be varied in such a way that the direction of the path of movement varies, to accommodate space restrictions. For instance, the locating mark carrier 20 can be displaced obliquely with respect to the locating mark carrier 19. Moreover, it is even possible to construct the locating mark carrier 20 so that it rotates in order to create such an apparatus in the smallest space possible. In the case of a rotating carrier the oval transparent surface 43 can be replaced by a round surface.

What is claimed is:

1. A microphotographic apparatus, comprising:
   a. a light source;
   b. a first carrier positioned along the path of light from said light source which has multiple sets of markings on it;
   c. a second carrier positioned along the path of light from said light source which has multiple sets of markings on it;
   d. at least one camera attachment which holds at least one film format; and
   e. a control apparatus coupled to said first carrier and coupled to said camera attachment, wherein said control apparatus moves said first carrier in response to the film format present in said camera attachment.

2. A microphotographic apparatus as claimed in claim 1, further comprising a first optical system which images an object plane into an image plane and a beam splitter which couples light from said light source into said first optical system.

3. A microphotographic apparatus as claimed in claim 1, wherein said first carrier and said second carrier are opaque and have transparent markings.

4. A microphotographic apparatus as claimed in claim 2, wherein said first carrier and said second carrier are opaque and have transparent markings.

5. A microphotographic apparatus as claimed in claim 1, wherein said camera attachment further comprises a control ring connected thereto, wherein a position of said control ring corresponds to the film format held by said at least one camera attachment.

6. A microphotographic apparatus as claimed in claim 5, wherein each of said camera attachments holds only one format of film and said control ring connected to each of said camera attachments has one fixed position.

7. A microphotographic apparatus according to claim 4, wherein said control apparatus further comprises a connection surface, a pin which is attached to said connection surface, a potentiometer connected to said pin and a control ring attached to each of said at least one camera attachments, wherein connection of said camera attachment to said connection surface positions said control ring such that it moves said pin which produces a signal corresponding to the film format of the camera attachment.

8. A microphotographic apparatus according to claim 4, further comprising a connection surface, a camera casing attached to said connection surface, electrical contact paths on said connection surface which are electrically connected to said control apparatus, contact pins on each of said camera attachments and an electrical circuit connected to said contact pins coupled to the film format in said camera attachment.

9. A microphotographic apparatus as claimed in claim 4, wherein said first and said second carriers are positioned in a direct vicinity of a plane conjugated to the image plane.

10. A microphotographic apparatus as claimed in claim 4, wherein the area at the center of said first carrier is oval in shape and is of a size which corresponds to a displacement path of said first carrier.

11. A microphotographic apparatus comprising:
  a. a first carrier having a first group of multiple sets of transparent markings;
  b. a second carrier having a second group of multiple sets of transparent markings which correspond to said first group of multiple sets of transparent markings;
  c. at least one camera attachment which holds at least one film format;
  d. means for moving said first carrier and said second carrier relative to one another to align one set of markings on said first carrier with the corresponding set of markings on said second carrier in accordance with the attached film format; and
  e. a first optical system imaging light which is projected through said first and second carriers to an image plane.

12. A microphotographic apparatus as claimed in claim 11, further comprising a second optical system for imaging an object plane to said image plane and for imaging said image plane to said camera attachment.

13. A microphotographic apparatus as claimed in claim 11, wherein said first and said second carriers are mostly opaque.

14. A microphotographic apparatus as claimed in claim 11, wherein said moving means further comprises a connection surface coupled to at least one of said first or said second carriers and a control ring, which is part of said camera attachment, for identifying the film format held by said camera attachment when said camera attachment is connected to said connection surface.

15. A microphotographic apparatus as claimed in claim 11, wherein said moving means further comprises a connection surface, a camera casing attached to said connection surface, electrical contact paths on said connection surface which are electrically connected to said control apparatus, contact pins on each of said camera attachments and an electrical circuit connected to said contact pins for identifying the film format in said camera attachment.

* * * * *